UNITED STATES PATENT OFFICE.

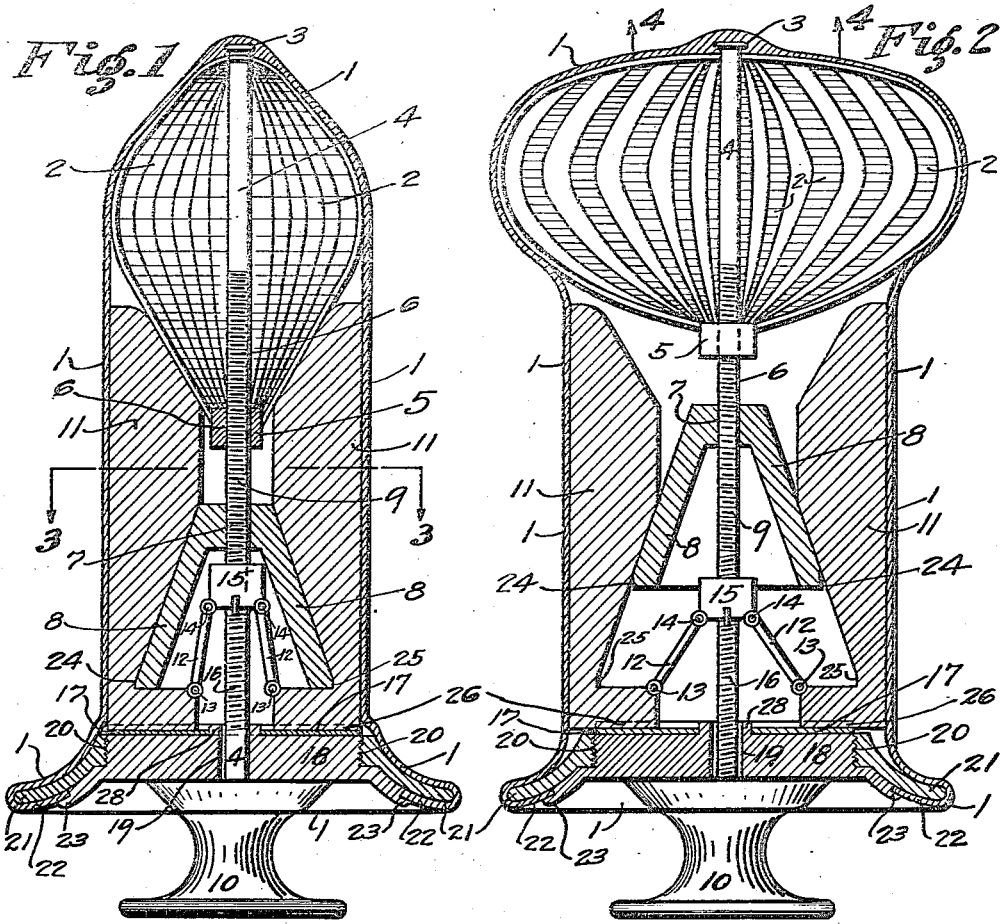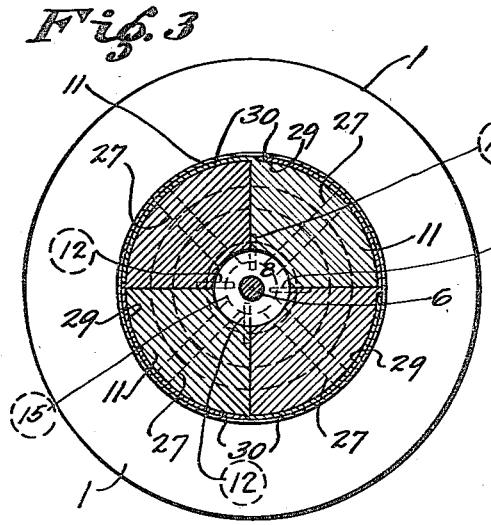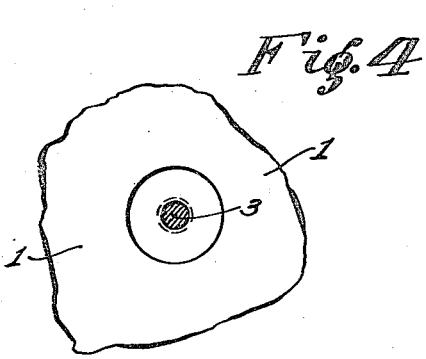

THEODORE J. FLACK, OF ST. LOUIS, MISSOURI.

RECTAL DILATOR.

1,271,456.                    Specification of Letters Patent.    Patented July 2, 1918.

Application filed December 3, 1917. Serial No. 205,023.

*To all whom it may concern:*

Be it known that I, THEODORE J. FLACK, a citizen of the United States, residing at the city of St. Louis, in the State of Missouri, have invented certain new and useful Improvements in Rectal Dilators, of which the following is a specification.

This invention is an improved rectal dilator for the surgical treatment of rectal and intestinal diseases, such, for instance, as piles, constipation, and the like.

By reason of its expansibility, one such device may be used where a plurality in series of the usual solid rectal dilators would otherwise be necessary. Greater comfort to the patient is, also, insured by the use of this device, having a relatively small entering end which can be expanded after entrance instead of the bulging-head dilators now in common use.

In the accompanying drawings forming part of this specification and in which like numbers of reference denote like parts wherever they occur, Figure 1 is a vertical section, with the parts in normal, *i. e.*, undistended, position;

Fig. 2 is a similar view, but showing the parts expanded as in use;

Fig. 3 is a horizontal sectional view on the line 3—3 in Fig. 1; and

Fig. 4 is a fragmentary view on the line 4—4 in Fig. 2.

The drawings are on an enlarged scale, in order that the construction and arrangement may be more clearly seen and understood, and the device in actual manufacture will be of such size as is appropriate for the uses hereinabove mentioned for which the same is intended.

The moving and expansible parts are inclosed within a flexible sheath or covering 1 composed of rubber or any other suitable material, which, as shown in the upper part of Fig. 2, is readily expansible upon the distention of the steel or other resilient ribs 2.

These ribs are preferably flat and preferably of the type of structure shown. The ends of the ribs 2 are suitably attached in any preferable way to the cap 3 on the stem 4 and the nut 5, respectively.

The nut 5 is internally threaded and adapted to travel on the threaded part 6 of stem 4.

A passage 7 through cone or wedge 8 is threaded so as to be adapted to travel on the threaded part 9 of stem 4.

The threaded part 6 on stem 4 and the corresponding threads within the passage through nut 5 are coarse as compared to the threads in passage 7 and at the part 9 of stem 4, with the result that when the knob 10 is turned the basket composed of ribs 2 expands more rapidly than the body part of sheath 1 opposite the expansion-members 11. As shown in Fig. 3, there are four such expansion-members 11. As clearly appears in Figs. 1 and 2, the interior of the expansion-members 11 is in shape like the interior of a hollow cone, *i. e.*, slanting toward a center and thereby adapted for wedge-like engagement and expansion by cone or wedge 8.

When, by turning knob 10 and thereby with it stem 4, wedge 8 has been advanced from the position shown in Fig. 1 to that depicted in Fig. 2, the natural tendency would be for the members 11 to tilt inwardly at the bottom, but this is prevented by the links 12 suitably pivoted thereto at 13 and also at 14 to nut 15.

Nut 15 is internally screwthreaded and adapted to travel upon the left-hand thread 16 (which thread is fine as compared to the threaded part 6). Thus, when nut 5 and wedge 8 are traveling forward on stem 4, nut 15 will be traveling in the opposite direction and thereby pushing upon links 12 and thereby forcing that part of members 11 adjacent to knob 10 outwardly and maintaining the body part of sheath 1 in the form substantially of a cylinder for the purpose of rectal dilation, while the larger expansion of the basket-like part formed by ribs 2 covered by the end of sheath 1 is maintained at a point in the patient farther in than the rectum.

The expansion body members 11 rest upon base-plate 17, which when wedge 8 is stationary are held in relatively fixed position by nut 15. On the other hand, base-plate 17 limits the movement of the members 11 in the direction toward knob 10, and the said base-plate 17 is fixed by the base 18 having the passage 19 therethrough for stem 4, knob 10 bearing against the outer face of base 18.

Base 18 is threaded at 20 to receive the threaded collar 21, around which is lapped the edge 22 of sheath 1, which edge is caught between the rim 23 of base 18 and the collar 21 when the said base 18 is screwed home.

To prevent binding, wedge 8 is flattened or cut away at 24, while the interior of members 11 is similarly shaped at 25 to receive the said flattened part.

Radial guides 26 at the ends of expansion-members 11 nearest knob 10 slide within a corresponding radial groove 27 in base-plate 17. Base 18 is provided with the boss 28 adjacent to passage 19 to hold base-plate 17 centrally.

As best shown in Fig. 3, the members 11 are constructed with peripheral grooves 29, which receive peripheral wings 30, whereby a smooth and substantially continuous exterior surface is presented by the expansion-members 11, whether distended or undistended, preventing pinching or abrasion of the delicate parts of the patient.

The operation of the device is as follows:

The non-bulging structure shown in Fig. 1 is without pain or inconvenience to the patient first inserted in the rectum, and then the knob 10 is slowly turned, thereby simultaneously advancing wedge 8 and nut 5 in one direction and nut 15 in the opposite direction, the said advance of nut 5 being relatively more rapid than that of wedge 8 and nut 15. The expansion of the body part composed of expansion-members 11 and the sheath 1 covering the same is likely to be felt more distinctly by the patient than the relatively larger distention of the basket-like structure composed of ribs 2 which is farther within the patient, where there is more room. For this reason, it is permissible and possible to dilate the said basket-like portion more rapidly and to a larger circumference than the body part opposite the expansion-members 11, which latter members may be formed of any suitable yieldable material, such for instance as rubber. After having been left in the dilated position shown in Fig. 2 for a sufficient length of time to accomplish the surgical purpose in view, knob 10 is turned in the opposite direction from that used for expansion, and the device is reduced to the position and relative size shown in Fig. 1, and then withdrawn from the patient. The movement of the parts for either dilation or contraction is dependent upon manual turning of knob 10 in the appropriate direction.

From the foregoing, it will be understood that the body-portion is composed of four radial members that are simultaneously expanded by the wedge 8 and that the same expand the flexible sheath 1, which sheath 1 entirely incloses the head expansion-members consisting of the basket-like structure composed of the ribs 2 and, also, incloses the expansion-members 11. Before use, the sheath will be covered with a suitable emollient.

Having thus described this invention, I hereby reserve the benefit of all changes in form, arrangement, order, or use of parts, as it is evident that many minor changes may be made therein without departing from the spirit of this invention or the scope of the following claims.

I claim:

1. A rectal dilator of equal diameter and circumference in cross-section except at the point of entrance, the said body-portion being expansible and when so expanded forming a head-portion of a different diameter and circumference from the body-portion proper, said expansion of the head and body-portion proper being simultaneously effected by separately actuated means, the said means consisting of a rotatable stem having thereon relatively coarser and finer thread portions, nuts adapted to coöperate, respectively, with the said coarser and finer threads, head expansion-members, and body expansion-members.

2. A rectal dilator of equal diameter and circumference in cross-section except at the point of entrance, the said body-portion being expansible and when so expanded forming a head-portion of a different diameter and circumference from the body-portion proper, said expansion of the head and body-portion proper being simultaneously effected by separately actuated means consisting of a rotatable stem having thereon relatively coarser and finer thread portions, nuts adapted to coöperate, respectively, with the said coarser and finer threads, head expansion-members, and body expansion-members, there being upon the said stem an additional threaded part of opposite pitch, a nut adapted to coöperate with the said last-mentioned threaded part, and links extending therefrom to the body expansion-members.

3. In a device of the type described, the combination of a flexible sheath, sets of expansion members contained therein, one of said sets of expansion members being adapted to be distended to a larger circumference than the other, means for simultaneously dilating said expansion members, said dilating means including a threaded element, coacting members threaded thereon, one of said sets of expansion members located between one of the said coacting members and said sheath, one of the said coacting members being a wedging member carried by said threaded element and engaging said last mentioned set of expansion members.

4. In a device of the character described, the combination of a flexible sheath, two sets of expansion-members contained therein, one of the said sets being adapted to be distended to a larger circumference than the other, and a means for simultaneously dilating the said expansion-members, the said dilating means consisting of a shaft having thereon portions of coarse and fine threads and members mounted thereon adapted, respectively, to coöperate with the said coarser and finer threads, and said expansion-members.

5. In a device of the character described, the combination of a flexible sheath, a central threaded stem, two sets of expansion-members, one of the said sets of expansion-members having on each member a beveled inner surface, and a wedge adapted to engage the said beveled surface, the said wedge having a screw-threaded part adapted to coöperate with the threads on the said stem.

6. In a device of the character described, the combination of two sets of expansion members, a differently threaded element for said sets of expansion members, a sheath covering both sets of expansion-members, co-acting elements between said sets of expansion-members and the different-threads of said threaded element and a wedging member engaging one set of said expansion-members and itself engaged by said threaded element.

7. In a device of the character described, a basket-like expansion means composed of a plurality of strips, another set of expansion-members, a sheath covering both sets of expansion-members, and means adapted simultaneously to dilate both sets of expansion members.

8. In a device of the character described, a basket-like expansion means, composed of a plurality of strips, another expansion means, a sheath covering both of the said expansion means, a unitary means for dilating both of the said expansion means, the said unitary means consisting of a threaded element, and means whereby the said expansion means are separately actuated by the said unitary means.

9. In a device of the character described, a sheath, head expansion-members, body expansion-members, the said head members being adapted to be expanded wider than the said body members and consisting of a plurality of ribs or strips, and means for dilating both sets of expansion-members including a wedging member coöperatively connected with said head and body expansion members.

10. In a device of the character described, a sheath, head expansion-members, body expansion-members, the said head members being adapted to be expanded wider than the said body members and consisting of a plurality of ribs or strips, and means for dilating both sets of expansion-members including a wedging member coöperatively connected with said head and body expansion members, the said means being adapted to expand the said head members more quickly than the said body members.

11. In a device of the character described, the combination of a sheath, a plurality of radial expansion-members within the sheath, each of the said expansion-members being provided with a peripheral groove and a projecting peripheral wing, and means for expanding the said expansion-members.

12. In a device of the character described, the combination of a sheath, a plurality of radial expansion-members within the sheath, each of the said expansion-members being provided with a peripheral groove and a projecting peripheral wing, and means for expanding the said expansion-members, the said means consisting of a wedge having a threaded passage therethrough and a rotatable threaded member for advancing the same.

In testimony whereof I hereunto affix my signature.

THEODORE J. FLACK.